United States Patent
Zink

(10) Patent No.: US 6,486,856 B1
(45) Date of Patent: Nov. 26, 2002

(54) APPARATUS FOR IMPROVED CONTRAST IN A MOTOR VEHICLE HEADS-UP DISPLAY

(75) Inventor: Oliver Zink, Inning (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/290,570

(22) Filed: Apr. 15, 1999

(30) Foreign Application Priority Data

Apr. 15, 1998 (DE) .......................................... 198 16 647

(51) Int. Cl.$^7$ ................................................. G09G 5/00
(52) U.S. Cl. ................................. 345/7; 345/8; 340/945
(58) Field of Search ........................ 345/7, 8; 340/945, 340/815.42, 815.5, 825.06, 436, 438, 439, 701.2; 349/11

(56) References Cited

U.S. PATENT DOCUMENTS

| | | | | |
|---|---|---|---|---|
| 5,005,009 A | * | 4/1991 | Roberts | 340/705 |
| H1109 H | * | 10/1992 | Roberts et al. | 340/705 |
| 5,408,357 A | * | 4/1995 | Beukema | 359/493 |
| 5,639,538 A | * | 6/1997 | Wong | 428/215 |
| 5,721,679 A | * | 2/1998 | Monson | 345/7 |

FOREIGN PATENT DOCUMENTS

| | | |
|---|---|---|
| DE | 41 16 043 | 11/1991 |
| DE | 42 42 797 | 7/1993 |
| JP | 3-67730 | 3/1991 |
| JP | 6-316264 | 11/1994 |
| JP | 8-91094 | 4/1996 |
| JP | 9-86225 | 3/1997 |

OTHER PUBLICATIONS

Copy of Office Action from Japanese Patent Office.
Article entittled "Development of Hologram Head–Up Display" by Hiroshi Kato et al., pp. 21–27.

* cited by examiner

Primary Examiner—Xiao Wu
Assistant Examiner—Ali Zamani
(74) Attorney, Agent, or Firm—Crowell & Moring LLP

(57) ABSTRACT

In an apparatus for improving the contrast in a motor vehicle heads-up display, the windshield, as viewed by the driver, is dark-tinted in a specific solid angle. Information shown by the heads-up display is visible to the driver in this specific solid angle. Furthermore, important information is visible when viewed in the specific solid angle, while other less important information is visible when viewed from a straight-ahead direction.

16 Claims, 1 Drawing Sheet

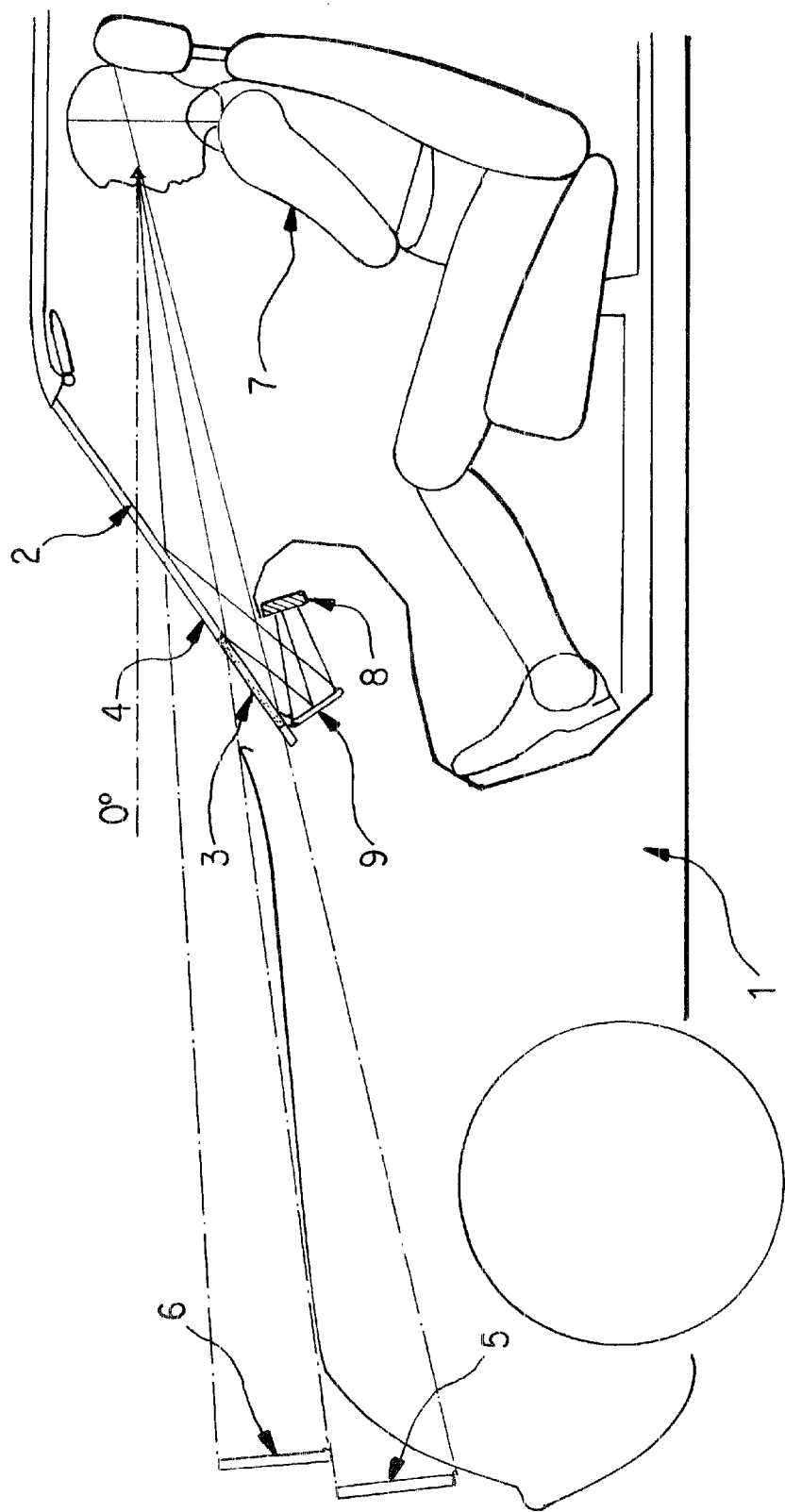

APPARATUS FOR IMPROVED CONTRAST IN A MOTOR VEHICLE HEADS-UP DISPLAY

BACKGROUND AND SUMMARY OF THE INVENTION

This application claims the priority of German application No. 198 16 647.8, filed Apr. 15, 1998, the disclosure of which is expressly incorporated by reference herein.

The present invention relates to an apparatus for improved contrast in a motor vehicle heads-up display.

Heads-up displays are known as systems for displaying information. Initially, these systems were used mainly in aircraft technology for displaying to the pilot information concerning the operating condition of the aircraft. Such heads-up displays produce an image of the displayed information, which can be recognized by the pilot directly in his field of vision. As a result, it is not necessary for the pilot to direct his eye away from the environment toward the instrument panel in order to read the displayed information. For some time, it has also been known to use such systems in the field of automotive technology. Images of the information to be displayed are produced in the driver's field of view through an optical system.

Problems can arise if the ambient brightness is high. Due to the subsequent reduced contrast between the displayed information and the background, the displayed information can become difficult to recognize and read. From SAE Paper 920600 (pp. 21 to 27, especially p. 25), it is known to avoid this problem by varying the brightness of the displayed information according to the ambient brightness. For example, in sunlight the information is displayed more brightly than it is in darkness.

Furthermore, in German patent document DE 41 16 043 C2, reference is made to Japanese patent publication No. 02-58284 which shows that a portion of a windshield is dark-colored, and displayed data are made visible by a heads-up display in which the windshield is darkened. This darkening can be achieved by tinting the windshield or by applying a film for this purpose. The windshield is thus, from the driver's viewpoint, dark-tinted within a certain angular range of view. Data presented in a heads-up display are visible for the driver within this specific solid angle.

German patent document DE 42 42 797 C2 discloses a display of information by means of a holographic plate. According to this document, to improve contrast the back of the hologram is tinted dark.

It is an object of the present invention to improve the readability of important data presented by means of a heads-up display.

This and other objects and advantages are achieved by an apparatus for improving the contrast of a heads-up display in a motor vehicle, in which important data are visible in the specific angle of view, while other data are visible in the straight-ahead direction.

It proves advantageous that the information for the driver is always visible at the same location. In the case of the important information (such as the vehicle's speed), the assurance is given, on account of its display in front of the darkened background, that it is generally readable regardless of the light conditions.

In a preferred embodiment according to the invention, the data indicated by the heads-up display is shown to the driver in the straight-ahead direction, while important information such as speed (or the like) is displayed in the lower, dark area of the windshield (area 3) and comparatively unimportant information, such as minimal interval, navigation indications (or the like) are displayed in the upper field (area 4).

Thus the driver can, under normal ambient luminous intensities, read the information in both windshield areas. If the ambient luminous intensity increases, the driver can no longer read unimportant information in his immediate field of view, but the important information is still easily readable in the lower display area.

The specific solid angle in which the windshield is darkened lies outside of the usual field of view of the driver which the driver must usually see while driving a motor vehicle. In comparison with other common display apparatus involving a combination instrument integrated into the instrument panel, an advantage is gained in that the driver need only change his line of sight by a small angle in order to be able to see the information. Furthermore, by using the heads-up display the advantage is retained in that the focusing of the eye, which usually approaches infinity when observing the surroundings while driving a vehicle, requires hardly any change. Nevertheless, sufficient contrast against the background is provided in the displayed information, so that the information can be seen easily at all times.

In another advantageous embodiment according to the invention, information is shown in a heads-up display in the driver's straight-ahead view and important information is still visible to the driver within the specific solid angle. Thus, in normal ambient light, the information is displayed for the driver without requiring a change in visual accommodation within the customary field of view. If the light conditions change such that the information is poorly or not at all visible on account of the lack of contrast with the ambient light, the driver can read the information with sufficient contrast in the specific solid angle.

In the previous embodiments according to the invention, it is advantageous that the area of the dark portion of the windshield is limited. The readability of important information is assured quite independently of light conditions. At the same time, in the embodiments the possibility is provided for making a great number of data displayable.

In a further embodiment according to the invention, the windshield seen by the driver is dark-toned in the lower area of the windshield. This area proves to be suitable since the driver can read the information simply by lowering his line of site, although this area usually must not be viewed while driving a motor vehicle.

In yet another embodiment according to the invention, the area of the windshield is tinted by impressing the tint onto the windshield by a printing method. This method of tinting is known and is already used in order to produce a darkened strip in the upper area of windshields of motor vehicles. This method can be used in order to advantageously darken the windshield in the appropriate area.

In still another embodiment according to the invention, the area of the windshield is tinted by tinting the inner layer of the windshield in an appropriate area. The film forming the inner layer can likewise be tinted comparatively easily within a certain area.

Other objects, advantages and novel features of the present invention will become apparent from the following detailed description of the invention when considered in conjunction with the accompanying drawings.

BRIEF DESCRIPTION OF THE DRAWINGS

Shown in the sole FIGURE is an embodiment of the present invention.

DETAILED DESCRIPTION OF THE DRAWINGS

The FIGURE shows a motor vehicle 1 with a windshield 2. This windshield 2 has a dark-tinted area 3. Also shown is a display apparatus which consists of an imaging device 8 and a mirror 9. With this display apparatus the driver 7 is given information in the form of a heads-up display. In the FIGURE the straight-ahead direction of the driver's view is identified by 0°. Additionally, areas 3 and 4 of the windshield are shown in which the driver 7 is able to see information not shown by the heads-up display.

Area 4 forms with the straight-ahead viewing direction only a relatively small angle, so that this area can also be seen or at least can be viewed with only a minimal head movement. The minimally important information 6 is visible to the driver through area 4 of the windshield 2.

Also, a dark-tinted area 3 is present in the windshield 2. Through this dark-tinted area 2 the driver 7 can read information in the specific solid angle of view, which is preferably important information such as the present speed of the vehicle, for example. Due to the dark tint of the area 3, a contrast regarding the display of this information is assured. As a result, the information 5 can be read.

In addition to the illustrated division of information, it is also possible to make all information visible in the specific solid angle of area 4 of the windshield and the most important information again in the specific solid angle of area 3 of the windshield 2.

The dark tinting can be made by printing this tint on the appropriate area of the windshield. It is furthermore possible to dye the film forming the inner layer at the appropriate area.

It has proven to be advantageous to arrange the area 3 of the windshield 2, which is associated with the specific angular viewing range, below the usual field of view of the driver 7. It is then possible to read the information with a minimum head movement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for improved contrast of a heads-up display in a motor vehicle,
   wherein a windshield of the motor vehicle, as viewed by a driver, is dark-tinted in a specific solid angle area, and
   wherein first important information shown by the heads-up display is visible to a driver within the specific solid angle area, while second less important other information is visible is a non dark-tinted area in said windshield outside said specific solid angle area when viewed from a straight-ahead direction.

2. The apparatus according to claim 1, wherein the dark-tint is in a lower area of the windscreen when viewed straight ahead by the driver.

3. The apparatus according to claim 1, wherein an area of the windshield has a printed tint.

4. The apparatus according to claim 2, wherein an area of the windshield has a printed tint.

5. The apparatus according to claim 1, wherein the dark-tint of the windshield is an inner layer of the windshield.

6. The apparatus according to claim 2, wherein the dark-tint of the windshield is an inner layer of the windshield.

7. Apparatus for improved contrast of a heads-up display in a motor vehicle,
   wherein a first portion of a windshield of the motor vehicle as seen by the driver is dark-tinted in a specific solid angle, area and
   wherein important information shown by the heads-up display is visible to the driver within the specific solid angle area, and
   further wherein other less important information shown by the heads-up display is displayed to the driver when viewed in a straight-ahead direction in a second non dark-tinted portion of windshield.

8. The apparatus according to claim 7, wherein the dark-tint is in a lower area of the windscreen when viewed straight ahead by the driver.

9. The apparatus according to claim 7, wherein an area of the windshield has a printed tint.

10. The apparatus according to claim 7, wherein the dark tint of the windshield is an inner layer of the windshield.

11. An improved contrast heads-up display for a motor vehicle, comprising:
    a windshield viewable by a driver over a defined angle of view, a portion of the windshield over a specific viewing angle less than the defined angle of view being tinted dark; and
    a heads-up imaging system which images display information within the defined angle of view, important information being visible within the specific viewing angle, with other less important information being visible outside the specific viewing angle is a non dark-tinted portion of the windshield.

12. The heads-up display according to claim 11, wherein the dark-tinted portion is in a lower area of the windscreen when viewed straight ahead by the driver.

13. The heads-up display according to claim 11, wherein the dark-tinted portion is a printed tint.

14. The heads-up display according to claim 12, wherein the dark-tinted portion of the windshield is a printed tint.

15. The heads-up display according to claim 11, wherein the dark-tinted portion of the windshield is an inner layer of the windshield.

16. A method of operating a heads-up display, comprising the acts of:
    imaging display information within a defined angle of view over a windshield viewed by a driver using the heads-up display;
    imaging a first important part of said display information within a dark-tinted portion of the windshield in a specific viewing angle less than the defined angle of view; and
    imaging a second less important part of said display information outside the specific viewing angle is a non dark-tinted portion of the windshield.

\* \* \* \* \*